I. P. HICKS,

Assignor to E. WILHELM.

Sewing Machine.

No. 9,652. Reissued April 12, 1881.

Chas. J. Buchheit
Edw. J. Brady
Witnesses.

I. P. Hicks Inventor.
By Wilhelm & Bonnell
Attorneys.

N. PETERS, PHOTO-LITHOGRAPHER, WASHINGTON, D. C.

UNITED STATES PATENT OFFICE.

ISAAC P. HICKS, OF CENTERVILLE, IOWA, ASSIGNOR TO EDWARD WILHELM, OF BUFFALO, NEW YORK.

SEWING-MACHINE.

SPECIFICATION forming part of Reissued Letters Patent No. 9,652, dated April 12, 1881.

Original No. 164,299, dated June 8, 1875. Application for reissue filed November 11, 1880.

*To all whom it may concern:*

Be it known that I, ISAAC P. HICKS, formerly of Pine Plains, in the county of Dutchess and State of New York, now of Centerville, in the county of Appanoose and State of Iowa, have invented certain new and useful Improvements in Sewing-Machines; and I do hereby declare that the following is a full, clear, and exact description thereof, reference being had to the accompanying drawings, forming part of this specification.

The object of this invention is to simplify the mechanism whereby the needle, shuttle, and feed-bar are actuated.

My invention consists, first, in the combination, with a feed-bar having an inclined slot therein, of an actuating device engaging in said slot and having a horizontal movement, induced by suitable mechanism, exceeding the length of the slot, and a limited movement within the slot, whereby both vertical and horizontal movements are imparted to the feed-bar in a positive manner, as will be hereinafter fully set forth; second, in a peculiar construction of this actuating device whereby its width is rendered adjustable at the point where it engages with the feed-bar, thereby effecting means for regulating the length of the stitch; third, of the peculiar means employed for rendering the end of this actuating device adjustable; fourth, of the particular construction of the friction device; fifth, of the particular means employed for attaching the friction device to the feed-bar; and sixth, of a novel combination of a single cam and a series of levers, whereby the needle, shuttle, and feed-bar are actuated simultaneously by the same cam, as will be hereinafter fully set forth.

Figure 1:
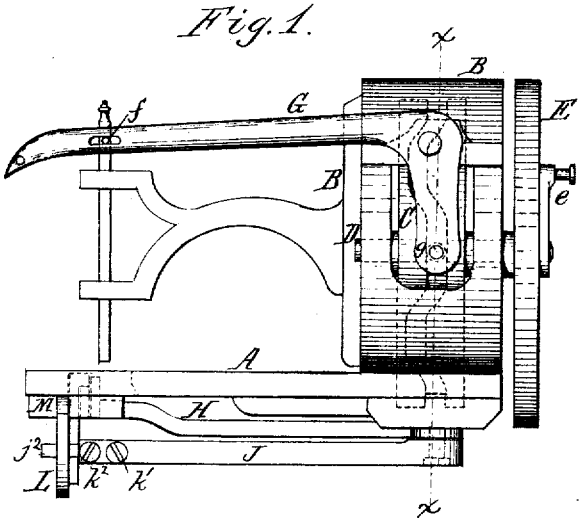
Figure 2:
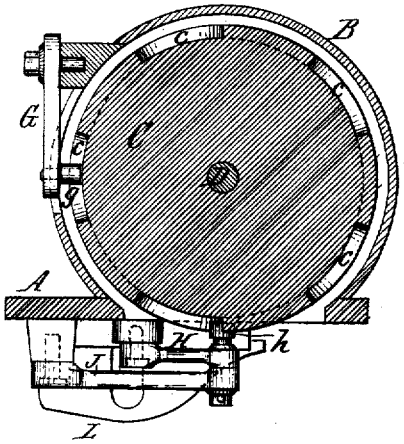
Figure 3:
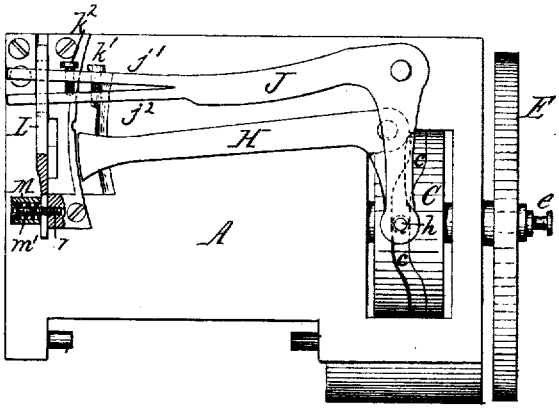
Figure 4:
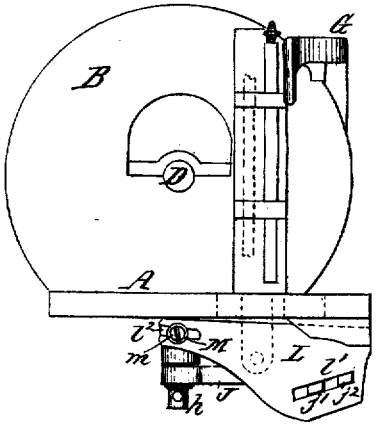

In the accompanying drawings, Figure 1 is a side elevation of a sewing-machine provided with my improvements. Fig. 2 is a vertical cross-section in line *x x*, Fig. 1. Fig. 3 is a bottom plan view, and Fig. 4 a front elevation, of the machine.

Like letters of reference refer to like parts in the several figures.

A represents the bed or table, on the rear portion of which is supported a frame or casing, B, in which works the cam C. The shaft D, on which the cam C is mounted, is journaled in bearings in the sides of the casing B, and carries at its rear end a fly-wheel, E, having a crank-pin, *e*, to which the connecting-rod is attached, which connects with the treadle.

*c* represents a serpentine groove formed in the face of the cam C, and having five turns or waves in each direction—that is to say, five toward the front and five toward the rear of the machine.

G is an elbow-lever, pivoted to one side of the casing B, so as to oscillate in a vertical plane parallel with the axis of the cam. The long arm of this lever extends forward and connects with the upper end of the needle-bar by a pivot, *f*. The short arm of the lever extends downward and is provided with a stud, *g*, which extends inward and engages with the serpentine groove *c* in the cam C, so that as the cam C revolves on its axis the lever G oscillates on its fulcrum.

H is an elbow-lever, pivoted to the under side of the table A, so as to oscillate in a horizontal plane. The long arm of this lever extends toward the front of the machine and operates the shuttle, and its short arm extends inward and is provided with a pin or stud, *h*, which engages in the groove *c* of the cam.

J is a similar lever, also pivoted to the under side of the table A, so as to oscillate in a horizontal plane below the shuttle-lever H, so that the latter works between the lever J and the under side of the table A. The lever J has its fulcrum nearer the edge of the table than the lever H, and its short arm is longer than the short arm of the lever H, and reaches to the end of the last-mentioned short arm, so that the pin *h*, which serves to give motion to the lever H, extends downward through the short arm of the lever J, connecting the ends of the short arms of both levers and giving motion to both at the same time, but causing their long arms to travel different distances, in accordance with the different lengths of the short arms. The long arm of the lever J extends to the front of the machine and operates the feed-dog L. The outer portion of the long arm is forked or divided into two elastic branches, $j^1$ $j^2$, which pass through an inclined slot, $l^1$, in the feed-bar. The elastic branches $j'$ $j^2$ of the lever J are provided with two set-screws, $k'$ $k^2$, for expanding and contracting the width of the fork. The screw $k'$ passes entirely through both branches, with its head resting against the outer side of the branch $j'$, and its thread engaging with a thread in the branch $j^2$. The screw $k^2$ passes only through the branch $j'$, with its thread engaging with a thread in said branch and its point bearing against the inner side of the branch $j^2$. The fork is expanded by loosening the screw $k'$ and then adjusting the screw $k^2$ to bear against the inner side of the branch $j^2$, and is contracted by loosening the screw $k^2$ and tightening up the screw $k'$. The inclined slot $l'$ is made somewhat longer than the extreme width of the forked end of the lever J, and the forked end of the lever is inclined on both its upper and lower sides to correspond with the inclined upper and lower sides of the slot $l'$.

The feed-bar L is attached to a suitable bracket or support on the under side of the table by means of a screw, $m$, passing loosely through a slot, $l^2$, in the feed-dog and entering the bracket. The outer portion of the screw $m$ is surrounded by a spiral spring, $m'$, the ends of which bear respectively against the feed-bar and the head of the screw, which spring and screw-head may be inclosed by a cap, M. By tightening or releasing the screw $m$ the pressure of the spring $m'$ against the feed-bar can be increased or reduced.

As the cam C revolves, the engagement of its serpentine groove $c$ with the short arms of the elbow-levers G H J imparts motion to the needle, shuttle, and feed mechanism at the same time, and the parts are so arranged with relation to each other that motion is imparted to each at the proper time. There being five double cams in the cam-groove, each revolution of the cam produces five stitches, and as the engagement of the needle-bar lever G with the cam-groove is at a point about one-quarter of a circle distant from the point of engagement of the shuttle-lever H and feed-lever J, the needle is always down when the shuttle passes through the loop, and always up when the feed carries the cloth forward. As the forked end of the lever J moves horizontally toward the left in Fig. 4, the feed-bar is first raised by the inclined end of the lever operating against the inclined upper side of the slot $l'$ until the end of the lever comes in contact with the end of the slot, when the vertical motion of the feed-bar ceases, and the horizontal motion of the same begins and continues until the lever J has completed its stroke. During the reverse movement of the lever J the feed-bar is first depressed until the forked end of the lever comes in contact with the opposite end of the inclined slot $l'$, when the horizontal backward movement of the feed-bar begins and continues until the lever J has completed its backward stroke. By this means both the vertical and horizontal movements are imparted to the feed-bar by the lever J. The pressure of the spring $m'$ against the slotted end of the feed-bar creates a friction which offers more resistance to the horizontal movements of the feed-bar than to the vertical movements of the same; hence the feed-bar is held against horizontal movement until the vertical movement, which is more easily executed, is completed and the actuating device has come in contact with the end of the inclined slot, when the pressure of the actuating device overcomes the friction of the spring and moves the feed-bar horizontally. In this manner the feed-bar is prevented from moving horizontally forward until it has been raised to the proper position, or backward until it has been depressed to the proper position, thereby insuring the proper movement of the feed-bar.

The stitch may be lengthened or shortened by adjusting the set-screws $k'$ $k^2$, so as to expand or contract the width of the fork, and thereby regulate its motion in the inclined slot $l'$ and the extent of longitudinal travel of the feed-bar consequent on such motion.

I claim as my invention—

1. The combination, with a feed-bar having an inclined slot, $l'$, of an actuating device, J, engaging in said slot and having a horizontal movement exceeding the length of the slot and a limited movement within the slot, and mechanism for operating the actuating device J, whereby both the vertical and horizontal movements are imparted to the feed-bar by the same actuating device J, the feed-bar being raised by the actuating device working against the upper inclined side of the slot $l'$ before the forward movement of the feed-bar begins, and the feed-bar being depressed by the actuating device working against the lower inclined side of the slot before the backward movement of the feed-bar begins, substantially as set forth.

2. The combination, with a feed-bar having slot $l'$, of an actuating device, J, provided with branches $j'$ $j^2$, engaging in the slot $l'$, and means whereby said branches can be contracted or expanded.

3. The combination, with a feed-bar having a slot $l'$, of the lever J, divided into branches $j'$ $j^2$, and provided with set-screws $k'$ $k^2$, substantially as set forth.

4. The combination, with a feed-bar having an inclined slot, $l'$, and an actuating device, J, engaging in said slot, whereby both the horizontal and vertical movements are imparted to the feed-bar, and mechanism for operating the actuating device J, of a pin or screw, $m$, supporting one end of the feed-bar, and a spring, $m'$, applied to the bolt $m$ and pressing against the feed-bar, substantially as set forth.

5. The combination, with a feed-bar supported at one end on a screw-bolt, $m$, and having an inclined slot, $l'$, and an actuating device, J, engaging in said slot, and mechanism for operating the actuating device J, of the friction-spring $m'$, applied to the screw-bolt $m$, and the cap M, covering the spring $m'$, substantially as set forth.

6. The combination, with the needle-bar G, shuttle-lever H, and feed-lever J, of a single cam, C, whereby motion is imparted to said levers simultaneously, substantially as set forth.

ISAAC P. HICKS.

Witnesses:
EDWARD WILHELM,
J. H. THOMPSON.

Correction in Reissued Letters Patent No. 9,652.

It is hereby certified that at the time reissued Letters Patent No. 9,652, were granted to Edward Wilhelm as assignee of Isaac P. Hicks, April 12, 1881, for an improvement in Sewing Machines, there was on record in this Office, (Liber I26, page 329, Transfers of Patents,) an assignment from said Edward Wilhelm of his entire interest to John M. Fair, of Buffalo, New York, and that the patent should have been issued to said John M. Fair, as owner of the entire interest; that the proper corrections have been made in the files and records pertaining to the case, and are hereby made in said Letters Patent to make the title therein comform to the records of the Patent Office.

Signed, countersigned, and sealed this 1st day of June, A. D. 1881.

[SEAL.]

A. BELL,
*Acting Secretary of the Interior.*

Countersigned:

E. M. MARBLE,
*Commissioner of Patents.*